United States Patent
Fujita et al.

(10) Patent No.: US 11,173,612 B2
(45) Date of Patent: Nov. 16, 2021

(54) ROBOT SYSTEM, ROBOT CONTROLLER, ROBOT CONTROL METHOD, AND ROBOT PROGRAM

(71) Applicant: YAMAHA HATSUDOKI KABUSHIKI KAISHA, Iwata (JP)

(72) Inventors: Takayoshi Fujita, Iwata (JP); Hirokatsu Muramatsu, Iwata (JP); Hiroyoshi Saiga, Iwata (JP); Kenji Ueno, Iwata (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 367 days.

(21) Appl. No.: 16/334,726

(22) PCT Filed: Sep. 23, 2016

(86) PCT No.: PCT/JP2016/078075
§ 371 (c)(1),
(2) Date: Mar. 19, 2019

(87) PCT Pub. No.: WO2018/055745
PCT Pub. Date: Mar. 29, 2018

(65) Prior Publication Data
US 2019/0262999 A1    Aug. 29, 2019

(51) Int. Cl.
*B25J 1/00* (2006.01)
*B25J 13/00* (2006.01)
(Continued)

(52) U.S. Cl.
CPC ......... *B25J 13/006* (2013.01); *B25J 9/0084* (2013.01); *B25J 9/0093* (2013.01); *B25J 9/163* (2013.01);
(Continued)

(58) Field of Classification Search
CPC ...... B25J 13/006; B25J 9/0084; B25J 9/0093; B25J 9/1605; B25J 9/163; B25J 9/1633; B25J 13/00; B25J 17/0258
(Continued)

(56) References Cited

U.S. PATENT DOCUMENTS 6,415,204 B1 * 7/2002 Hirabayashi .......... B23P 21/004
700/245

FOREIGN PATENT DOCUMENTS

DE        3012088 A1   10/1980
DE   102005051094 A1    5/2006
(Continued)

OTHER PUBLICATIONS

International Search Report issued in PCT/JP2016/078075; dated Dec. 6, 2016.
An Office Action issued by the German Patent and Trade Mark Office dated Apr. 7, 2020, which corresponds to German Patent Application No. 112016007254.6 and is related to U.S. Appl. No. 16/334,726 with English language translation.

*Primary Examiner* — Thomas E Worden
*Assistant Examiner* — Tiffany P Ohman
(74) *Attorney, Agent, or Firm* — Studebaker & Brackett PC

(57) ABSTRACT

It is possible simply switch between a mode of causing one robot to perform an operation independently from another robot and another mode of causing one robot and another robot to perform an operation in cooperation. A robot system includes a first-type robot, a first-type control part which takes charge of drive control of the first-type robot, a second-type robot, and a second-type control part which takes charge of drive control of the second-type robot. When the first-type robot and the second-type robot perform an operation on the same object in cooperation, a control part in charge of drive control of the second-type robot is changed from the second-type control part to the first-type control part, and the first-type control part takes charge of
(Continued)

drive control of the first-type robot and the second-type robot.

19 Claims, 8 Drawing Sheets

(51) Int. Cl.
  *B25J 9/00* (2006.01)
  *B25J 9/16* (2006.01)
  *B25J 17/02* (2006.01)
(52) U.S. Cl.
  CPC .......... *B25J 9/1605* (2013.01); *B25J 9/1633* (2013.01); *B25J 13/00* (2013.01); *B25J 17/0258* (2013.01)
(58) Field of Classification Search
  USPC ....................................................... 700/245
  See application file for complete search history.

(56) References Cited

FOREIGN PATENT DOCUMENTS

| | | |
|---|---|---|
| DE | 60035651 T2 | 5/2008 |
| DE | 102012213583 A1 | 2/2013 |
| EP | 2699070 A2 | 2/2014 |
| EP | 2144127 B1 | 4/2014 |
| JP | H01-081288 U | 5/1989 |
| JP | H08-141957 A | 6/1996 |
| JP | H08-174448 A | 7/1996 |
| JP | H09-174345 A | 7/1997 |
| JP | 2001-150372 A | 6/2001 |
| JP | 2013-082042 A | 5/2013 |
| JP | 2015-009324 A | 1/2015 |
| JP | 2015-186295 A | 10/2015 |
| WO | 2013/157120 A1 | 10/2013 |

\* cited by examiner

ROBOT SYSTEM, ROBOT CONTROLLER, ROBOT CONTROL METHOD, AND ROBOT PROGRAM

CROSS-REFERENCE TO RELATED APPLICATION

This application is a National Stage of International Patent Application No. PCT/JP2016/078075, filed Sep. 23, 2016, the entire contents of which is incorporated herein by reference.

BACKGROUND

Technical Field

The present disclosure relates to a technique for controlling drive of a plurality of robots which perform an operation on the same object in cooperation.

Background Art

In assembling sites of products and the like, conventionally, robots with built-in motor have been widely used. Further, FIG. 2 of JP9-174345 shows a technique for simultaneously controlling a plurality of motors incorporated in the robots. Specifically, controllers are provided respectively corresponding to the plurality of motors. The controllers are coupled by a communication cable, to thereby enable multi-axis simultaneous control.

SUMMARY

In an environment where a plurality of robots are provided, in order to handle diverse operations, it is preferable to simply switch between a mode of causing one robot to independently perform an operation and another mode of causing one robot and another robot to perform an operation in cooperation. Then, it is considered to apply the technique disclosed in JP9-174345. Specifically, control parts are provided respectively corresponding to these robots, and the control parts are connected to one another by a communication cable. Then, in the former mode, the control part controls the corresponding one robot, to thereby cause the robot to perform an operation independently of other robots. On the other hand, in the latter mode, each control part adjusts control timing of the corresponding robot on the basis of communication through the communication cable, to thereby cause the one robot and the other robots to perform an operation in cooperation.

Actually, however, it is not necessarily easy for the control parts to accurately adjust the control timing of the robots on the basis of the communication between the control parts, with required accuracy and speed, to thereby cause the one robot and the other robot to perform the operation in cooperation. Therefore, it has not been appropriate to apply the technique disclosed in JP9-174345.

The present disclosure provides a technique for allowing simple switching between a mode in which one robot performs an operation independently of other robots and another mode in which the one robot and the other robots perform an operation in cooperation.

A robot system according to the present disclosure comprises a first-type robot, a first-type control part which takes charge of drive control of the first-type robot, a second-type robot, and a second-type control part which takes charge of drive control of the second-type robot. When the first-type robot and the second-type robot perform an operation on the same object in cooperation, a control part in charge of drive control of the second-type robot is changed from the second-type control part to the first-type control part, and the first-type control part takes charge of drive control of the first-type robot and the second-type robot.

A robot controller according to the present disclosure comprises a first-type control part which takes charge of drive control of a first-type robot, and a second-type control part which takes charge of drive control of a second-type robot. When the first-type robot and the second-type robot perform an operation on the same object in cooperation, a control part in charge of drive control of the second-type robot is changed from the second-type control part to the first-type control part, and the first-type control part takes charge of drive control of the first-type robot and the second-type robot.

A robot control method according to the present disclosure, comprises a step in which a first-type control part takes charge of drive control of a first-type robot while a second-type control part takes charge of drive control of a second-type robot, and a step in which a control part in charge of drive control of the second-type robot is changed from the second-type control part to the first-type control part, and the first-type control part takes charge of drive control of the first-type robot and the second-type robot, to thereby cause the first-type robot and the second-type robot to perform an operation on the same object in cooperation.

A robot program according to the present disclosure causes a computer execute a step in which a first-type control part takes charge of drive control of a first-type robot while a second-type control part takes charge of drive control of a second-type robot, and a step in which drive control of the second-type robot is transferred from the second-type control part to the first-type control part, and the first-type control part takes charge of drive control of the first-type robot and the second-type robot, to thereby cause the first-type robot and the second-type robot to perform an operation on the same object in cooperation.

In the present disclosure (robot system, robot controller, robot control method, and robot program) configured as above, the first-type control part takes charge of drive control of the first-type robot while the second-type control part takes charge of drive control of the second-type robot. Therefore, the first-type control part performs the drive control of the first-type robot, to thereby cause the first-type robot to perform an operation independently of the second-type robot. Alternatively, the second-type control part performs the drive control of the second-type robot, to thereby cause the second-type robot to perform an operation independently of the first-type robot. Further, a control part in charge of the drive control of the second-type robot is changed from the second-type control part to the first-type control part and the first-type control part takes charge of the drive control of the first-type robot and the second-type robot, to thereby cause the first-type robot and the second-type robot to perform an operation on the same object in cooperation. In other words, by switching a control part in charge of drive control of the second-type robot from the second-type control part to the first-type control part, it is possible to cause the first-type robot and the second-type robot to perform an operation in cooperation. Thus, it is possible to simply switch between a mode in which one robot performs an operation independently of the other robot and another mode in which one robot and the other robot perform an operation in cooperation.

The robot system may be configured so that after an operation performed by the first-type robot and the second-type robot in cooperation is completed, a control part in charge of drive control of the second-type robot is changed from the first-type control part to the second-type control part. Therefore, after the operation performed by the first-type robot and the second-type robot in cooperation is completed, the second-type control part takes charge of the drive control of the second-type robot, and it is thereby possible to cause the second-type robot to perform an operation independently of the first-type robot.

The robot system may be configured so that the second-type robot transfers the object between a plurality of the first-type robots, the first-type robot performs an operation on the object transferred by the second-type robot, in cooperation with the second-type robot, the second-type control part takes charge of drive control of the second-type robot which transfers the object between the different first-type robots, and when the second-type robot performs an operation in cooperation with the first-type robot which is a transfer destination of the object out of the plurality of the first-type robots, a control part in charge of drive control of the second-type robot is changed to the first-type control part in charge of drive control of the first-type robot which is the transfer destination.

In such a configuration, the second-type robot transfers the object between the plurality of first-type robots, and each of the first-type robots performs an operation on the object transferred by the second-type robot. Thus, through an assembly line operation using the plurality of first-type robots, it is possible to efficiently perform an operation on the object. Further, the first-type robot performs an operation on the object transferred by the second-type robot, in cooperation with the second-type robot. Thus, by causing the first-type robot and the second-type robot to cooperate, it is possible to effectively utilize the degree of freedom of the second-type robot in execution of the operation.

The robot system may be configured so that among a first direction, a second direction, and a third direction which are orthogonal to one another, the second-type robot transfers the object in the first direction with a degree of freedom in the first direction and does not have any degree of freedom in the second direction or the third direction, the first-type robot has an end effector which performs an operation on the object, and has a degree of freedom in the second direction and the third direction and does not have any degree of freedom in the first direction, and in an operation performed by the first-type robot and the second-type robot in cooperation, the first-type control part causes the second-type robot to perform an operation to move the end effector relatively to the object in the first direction and causes the first-type robot to perform an operation to move the end effector relatively to the object in the second direction and the third direction.

In such a configuration, in order to move the end effector of the first-type robot relatively to the object, the second-type robot having the degree of freedom in the first direction which is a transfer direction of the object takes charge of the relative movement in the first direction and the first-type robot having the degree of freedom in the second direction and the third direction takes charge of the relative movement in the second direction and the third direction. Thus, since the first-type robot and the second-type robot perform an operation in cooperation while sharing the loads, it is possible to reduce the degree of freedom (in other words, the number of axes) that each of the first-type robot and the second-type robot has to minimum and to simplify the configuration.

The robot system may be configured so that among a first direction, a second direction, and a third direction which are orthogonal to one another, the second-type robot transfers the object in the first direction and the second direction with a degree of freedom in the first direction and the second direction and does not have any degree of freedom in the third direction, the first-type robot has an end effector which performs an operation on the object, and has a degree of freedom in the third direction and does not have any degree of freedom in the first direction or the second direction, and in an operation performed by the first-type robot and the second-type robot in cooperation, the first-type control part causes the second-type robot to perform an operation to move the object relatively to the end effector in the first direction and the second direction and causes the first-type robot to perform an operation to move the end effector relatively to the object in the third direction.

In such a configuration, in order to move the end effector of the first-type robot relatively to the object, the second-type robot having the degree of freedom in the first direction and the second direction which are transfer directions of the object takes charge of the relative movement in the first direction and the second direction and the first-type robot having the degree of freedom in the third direction takes charge of the relative movement in the third direction. Thus, since the first-type robot and the second-type robot perform an operation in cooperation while sharing the loads, it is possible to reduce the degree of freedom (in other words, the number of axes) that each of the first-type robot and the second-type robot has to minimum and to simplify the configuration.

The robot system may be configured so that among a first direction, a second direction, and a third direction which are orthogonal to one another, the second-type robot transfers the object in the first direction with a degree of freedom in the first direction, the first-type robot has a degree of freedom in the first direction, the second direction, and the third direction, and in an operation performed by the first-type robot and the second-type robot in cooperation, the first-type control part causes the second-type robot to perform an operation to transfer the object in the first direction and causes the first-type robot to perform an operation to move the end effector relatively to the object in the first direction, the second direction, and the third direction.

In such a configuration, in the operation performed by the first-type robot and the second-type robot in cooperation, the operation of transferring the object in the first direction is performed by the second-type robot and the operation of moving the end effector relatively to the object in the first direction, the second direction, and the third direction is performed by the first-type robot. Therefore, since the object is continuously transferred in the first direction during the operation performed on the object, the transfer of the object can be performed swiftly and this is advantageous in reducing the takt time (i.e., time required to complete all the defined operations on the object W).

The robot system may be further comprises: a third-type robot; and a third-type control part which takes charge of drive control of the third-type robot, wherein when the first-type robot, the second-type robot, and the third-type robot perform an operation in cooperation, a control part of drive control of the third-type robot is changed from the third-type control part to the first-type control part, and the first-type control part takes charge of drive control of the first-type robot, the second-type robot, and the third-type robot. Thus, in the case where the third-type robot is further provided, by switching a control part in charge of the drive control of the third-type robot from the third-type control part to the first-type control part, it is possible to cause the first-type robot, the second-type robot, and the third-type robot to perform an operation in cooperation.

According to the present disclosure, it is possible to simply switch between a mode in which one robot performs an operation independently of the other robot and another mode in which one robot and the other robot perform an operation in cooperation.

DETAILED DESCRIPTION

Figure 1:
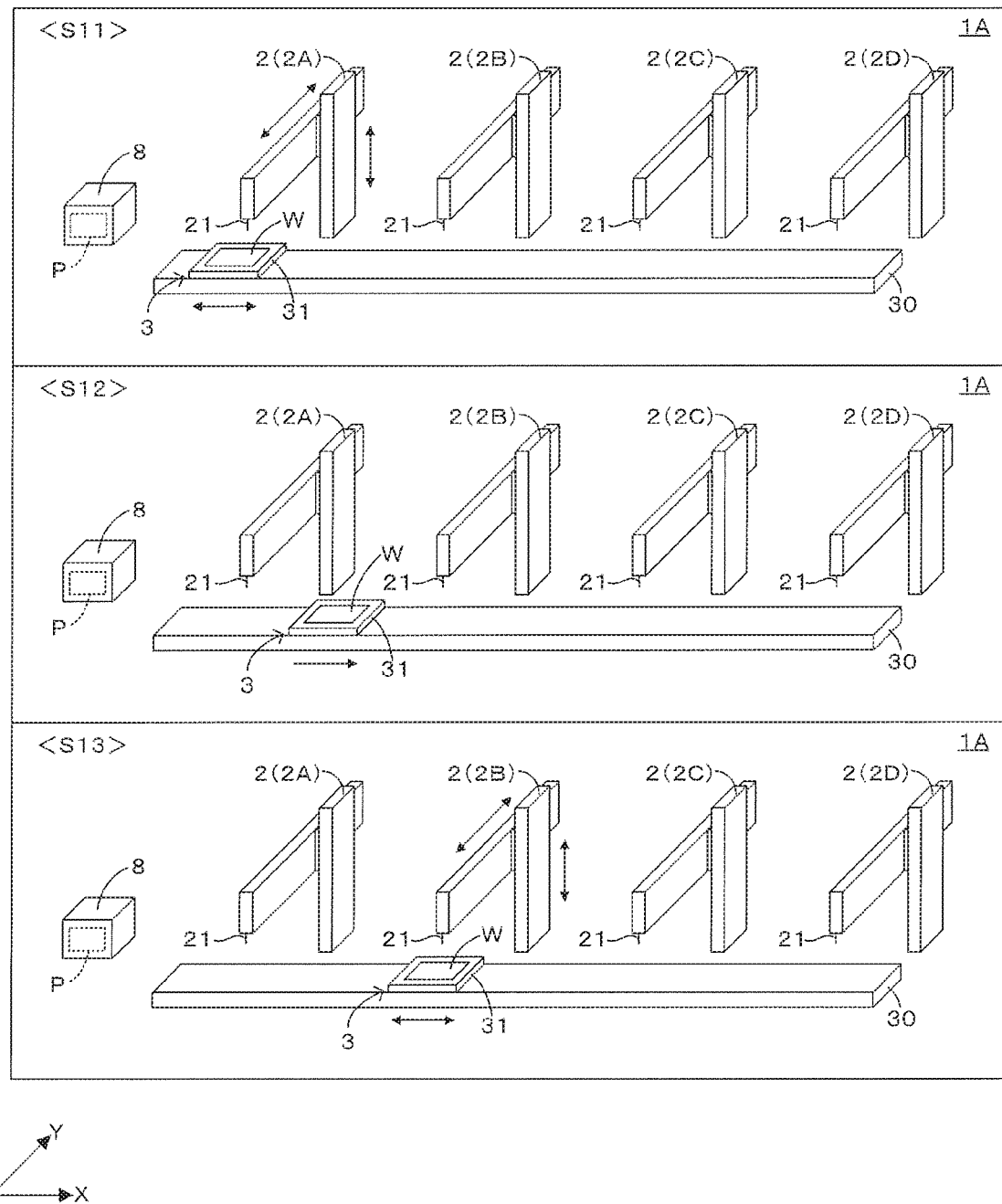
FIG. 1 is a view schematically showing a configuration of a robot system in accordance with a first embodiment of the present disclosure.
Figure 2:
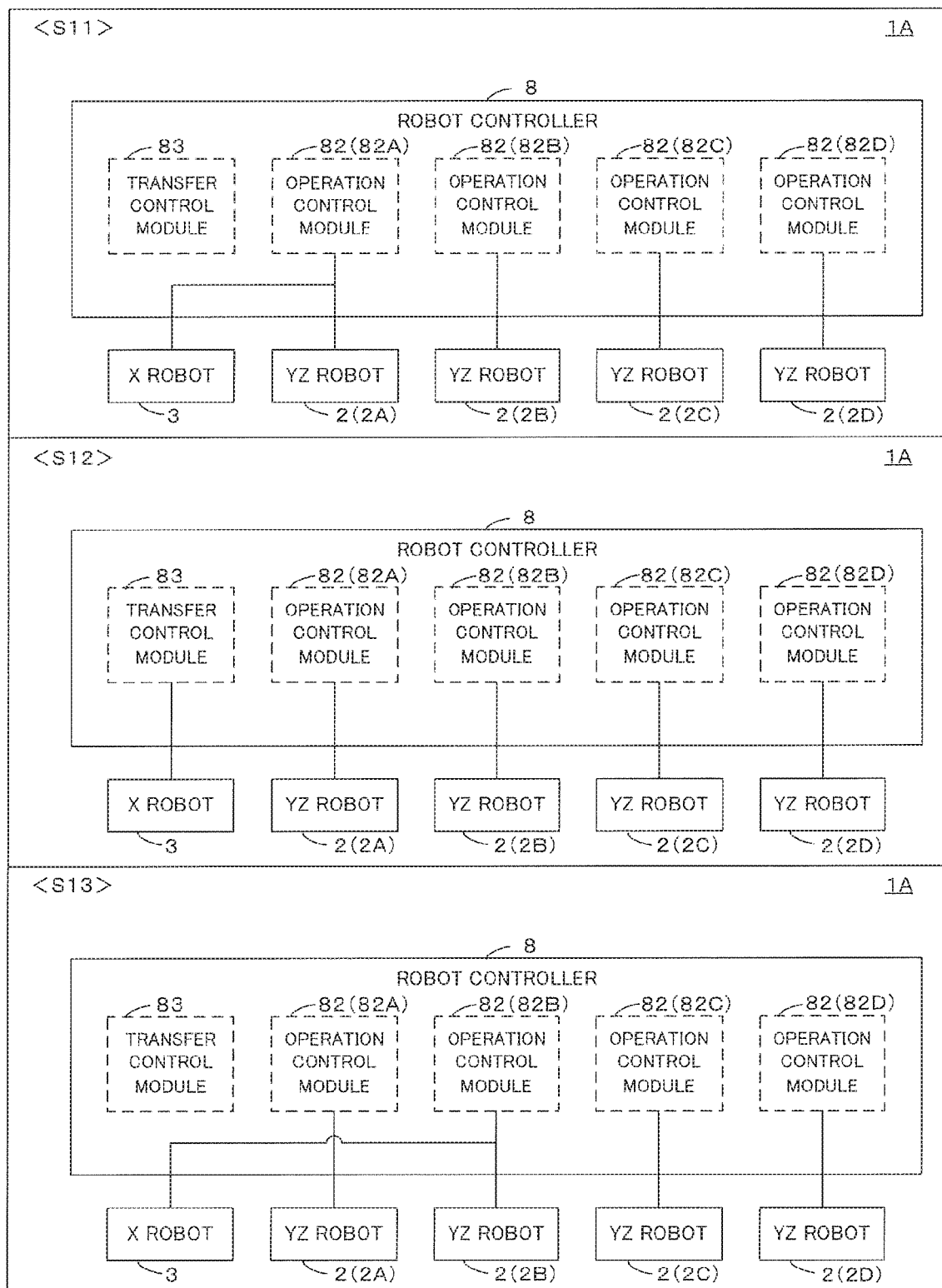
FIG. 2 is a block diagram showing an electrical structure provided in the robot system of FIG. 1.

FIG. 1 is a view schematically showing a configuration of a robot system in accordance with a first embodiment of the present disclosure. FIG. 2 is a block diagram showing an electrical structure provided in the robot system of FIG. 1. Further, FIGS. 1 and 2 illustrate different Steps S11, S12, and S13 performed by a robot system 1A. In FIG. 1 and the following figures, an XYZ rectangular coordinate system with an XY plane as a horizontal plane and a Z direction as a vertical direction is shown as appropriate.

The robot system 1A includes four YZ robots 2 which have the same structure. In FIGS. 1 and 2, for distinction, the four YZ robots 2 are also represented by different reference signs 2A to 2D. Each of the YZ robots 2 has an end effector 21 and has degrees of freedom in a Y direction and a Z direction. Specifically, the YZ robot 2 incorporates two axes motors respectively corresponding to the Y direction and the Z direction to thereby move the end effector 21 in each of the Y direction and the Z direction by these motors. As a specific type of the end effector 21, various types can be assumed to be used. In a case where drawing is performed on an object W, for example, the end effector 21 is a pen or an application nozzle. Further, in a case where component mounting is performed on the object W, the end effector 21 is a nozzle for adsorbing a component or a holding device for holding a component.

The robot system 1A further includes one X robot 3. The X robot 3 has a table 31 for supporting the object W and has a degree of freedom in the X direction. Specifically, in the robot system 1A, a linear guide 30 incorporating screws arranged in parallel with the X direction is disposed, and nuts provided on the table 31 of the X robot 3 are threadedly engaged with the screws of the linear guide 30, to thereby form ball screws. Then, the X robot 3 uses a built-in motor (e.g., a hollow motor) to rotate the nuts, to thereby integrally move with the table 31 in the X direction. Thus, the X robot 3 can move the table 31 supporting the object W in the X direction. Further, this X robot 3 is detachable from the linear guide 30, and the X robot 3 can enter the linear guide 30 from one end in the X direction and get out from the linear guide 30 from the other end in the X direction. The mechanism for moving the table 31 in the X direction is not limited to the above-described mechanism, but a mechanism using neither the screws nor the nuts, for example, a linear motor may be used. In this case, a mover of the linear motor may be attached to the table 31 and a stator thereof may be attached to the linear guide 30.

The four YZ robots 2 are aligned adjacent to the linear guide 30 along the X direction and the X robot 3 moves the table 31 in the X direction, to thereby transfer the object W in the X direction among the four YZ robots 2. Then, each of the YZ robots 2 performs an operation on the transferred object W. At that time, the YZ robot 2 and the X robot 3 perform the operation on the object W in cooperation. In a case where a drawing operation in which a circular mark is drawn on the object W is performed, for example, the YZ robot 2 moves the end effector 21 down in the Z direction, to thereby cause the end effector 21 to come into contact with the object W on the table 31 of the X robot 3. Subsequently, the YZ robot 2 causes the end effector 21 to perform simple harmonic motion in the Y direction while the X robot 3 causes the table 31 to perform simple harmonic motion in the X direction at antiphase with the simple harmonic motion of the end effector 21. The circular mark is thereby drawn on the object W. After the drawing operation is completed, the YZ robot 2 moves the end effector 21 up in the Z direction and the X robot 3 moves the table 31 in the X direction, to thereby transfer the object W to another YZ robot 2. Then, this YZ robot 2 performs another operation on the object W in cooperation with the X robot 3.

This robot system 1A includes a robot controller 8 for controlling drive of each YZ robot 2 and the X robot 3. Then, the robot controller 8 executes a robot program P which defines an operation to be performed by the robot system 1A, and the above-described operation, for example, is thereby performed on the object W. Further, a user generates the robot program P and loads the robot program P into the robot controller 8 in advance.

This robot controller 8 is a computer on which a CPU (Central Processing Unit) and memories are mounted. Then, the robot controller 8 executes the robot program P stored in the memory mounted thereon, to thereby virtually construct an operation control module 82 and a transfer control module 83. The operation control module 82 is generated for each YZ robot 2, and four operation control modules 82 are generated in one-to-one correspondence with the four YZ robots 2. Then, each of the operation control modules 82 takes charge of drive control of the motor of the corresponding YZ robot 2. Further, the transfer control module 83 takes charge of drive control of the motor of the X robot 3.

In FIG. 2, for distinction, the four operation control modules 82 are also represented by different reference signs 82A to 82D. Further, FIG. 2 shows that the control modules 82, 83 take charge of the drive control of the robots 2, 3 connected to themselves, respectively.

This robot system 1A can perform various operations in accordance with contents of the robot programs P. Herein, a case will be described where the X robot 3 transfers the object W to the four YZ robots 2 sequentially from the left side while each of the YZ robots 2 and the X robot 3 perform an operation on the object W in cooperation.

In Step S11, shown is a state in which the X robot 3 has transferred the object W to the YZ robot 2A. In this state, the operation control module 82A requests docking between the YZ robot 2A and the X robot 3. The YZ robot 2A and the X robot 3 are thereby virtually docked with each other, to serve as one XYZ robot. Specifically, the robot controller 8 changes a control module in charge of drive control of X robot 3 from the transfer control module 83 to the operation control module 82A, and the operation control module 82A takes charge of the drive control of the YZ robot 2A and the drive control of the X robot 3 (Step S11 of FIG. 2). Then, the operation control module 82A generates a motion for performing a defined operation defined by the robot program P for each of the YZ robot 2A and the X robot 3 by computation. The operation control module 82A synchronizes execution of the motion of the YZ robot 2A and execution of the motion of the X robot 3. The YZ robot 2A and the X robot 3 thereby perform the defined operation on the object W in cooperation.

After the YZ robot 2A and the X robot 3 complete the defined operation, the operation control module 82A requests disengagement of the X robot 3 from the YZ robot 2A. The X robot 3 is thereby disengaged from the YZ robot 2A, and the X robot 3 and the YZ robot 2A can perform operations independently of each other. Specifically, as shown in Step S12 of FIG. 2, the robot controller 8 changes a control module in charge of the drive control of the X robot 3 from the operation control module 82A to the transfer control module 83, and then the transfer control module 83 takes charge of the drive control of the X robot 3. The transfer control module 83 generates a motion for performing a transfer operation defined by the robot program P by computation. Then, in response to a command from the transfer control module 83, the X robot 3 performs the motion, to thereby transfer the object W from the YZ robot 2A to the YZ robot 2B (Step S12 of FIG. 1). Thus, the transfer control module 83 takes charge of the drive control of the X robot 3 which transfers the object W between the different YZ robots 2.

After the object W is transferred to the YZ robot 2B (Step S13 of FIG. 1), the operation control module 82B requests docking between the YZ robot 2B and the X robot 3. As shown in Step S13 of FIG. 2, the X robot 3 and the YZ robot 2B are thereby virtually docked with each other, to serve as one XYZ robot. Then, in the same manner as described above, the YZ robot 2B and the X robot 3 perform a defined operation on the object W in cooperation.

After the YZ robot 2B and the X robot 3 complete the defined operation, in the same manner as described above, the X robot 3 transfers the object W in the X direction and performs a defined operation on the object W in cooperation with each of the YZ robot 2C and the YZ robot 2D. All the defined operations on the object W in the robot system 1A are thereby completed.

In the first embodiment described above, the operation control module 82 takes charge of the drive control of the YZ robot 2 while the transfer control module 83 takes charge of the drive control of the X robot 3. Therefore, the transfer control module 83 performs the drive control of the X robot 3, to thereby cause the X robot 3 to perform the transfer operation of the object W independently of the YZ robot 2. Further, the control module in charge of the drive control of the X robot 3 is changed from the transfer control module 83 to the operation control module 82, and the operation control module 82 can take charge of the drive control of the YZ robot 2 and the X robot 3. Specifically, the operation control module 82 synchronizes execution of the motion of the YZ robot 2 and execution of the motion of the X robot 3 and causes the YZ robot 2 and the X robot 3 to perform a defined operation on the same object W in cooperation. Thus, by changing the control module in charge of the drive control of the X robot 3 from the transfer control module 83 to the operation control module 82, it is possible to cause the YZ robot 2 and the X robot 3 to perform the defined operation in cooperation. It is thereby possible to simply switch between a mode in which the X robot 3 performs an operation independently of the YZ robot 2 and another mode in which the X robot 3 and the YZ robot 2 perform an operation in cooperation.

Particularly, instead of synchronizing the robots on communication through a communication cable, by changing the control module in charge of the drive control of the X robot 3 between the control modules 82 and 83 which are virtually constructed by the CPU and the memory, the respective motions of the YZ robot 2 and the X robot 3 are synchronized. Therefore, the YZ robot 2 and the X robot 3 are synchronized without being subjected to any restriction on communication, and it is possible to perform synchronization between the YZ robot 2 and the X robot 3 at high speed and with high accuracy. As a result, it is possible to swiftly complete each defined operation defined by the robot program P and to thereby reduce the takt time (i.e., time required to complete all the defined operations on the object W).

Further, after the defined operation performed by the YZ robot 2 and the X robot 3 in cooperation is completed, the control module in charge of the drive control of the X robot 3 is changed from the operation control module 82 to the transfer control module 83. It is thereby possible to cause the X robot 3 to start the transfer operation independently of the YZ robot 2.

Furthermore, the X robot 3 transfers the object W among the plurality of YZ robots 2 and each YZ robot 2 performs a defined operation on the object W transferred by the X robot 3. Thus, through an assembly line operation using the plurality of YZ robots 2, it is possible to efficiently perform an operation on the object W. Further, the YZ robot 2 performs an operation on the object W transferred by the X robot 3 in cooperation with the X robot 3. Thus, by causing the YZ robot 2 and the X robot 3 to cooperate, it is possible to effectively utilize the degree of freedom of the X robot 3 in execution of the defined operation.

In other words, in order to move the end effector 21 of the YZ robot 2 relatively to the object W, the X robot 3 having the degree of freedom in the X direction which is a transfer direction of the object W takes charge of the relative movement in the X direction and the YZ robot 2 having the degrees of freedom in the Y direction and the Z direction takes charge of the relative movement in the Y direction and the Z direction. Thus, since the YZ robot 2 and the X robot 3 perform a defined operation in cooperation while sharing the loads, it is possible to reduce the degrees of freedom (in other words, the number of axes) that each of the YZ robot 2 and the X robot 3 has, to minimum (2 axes+1 axis=3 axes), and to simplify the configuration of the robot system 1A.

Figure 3:
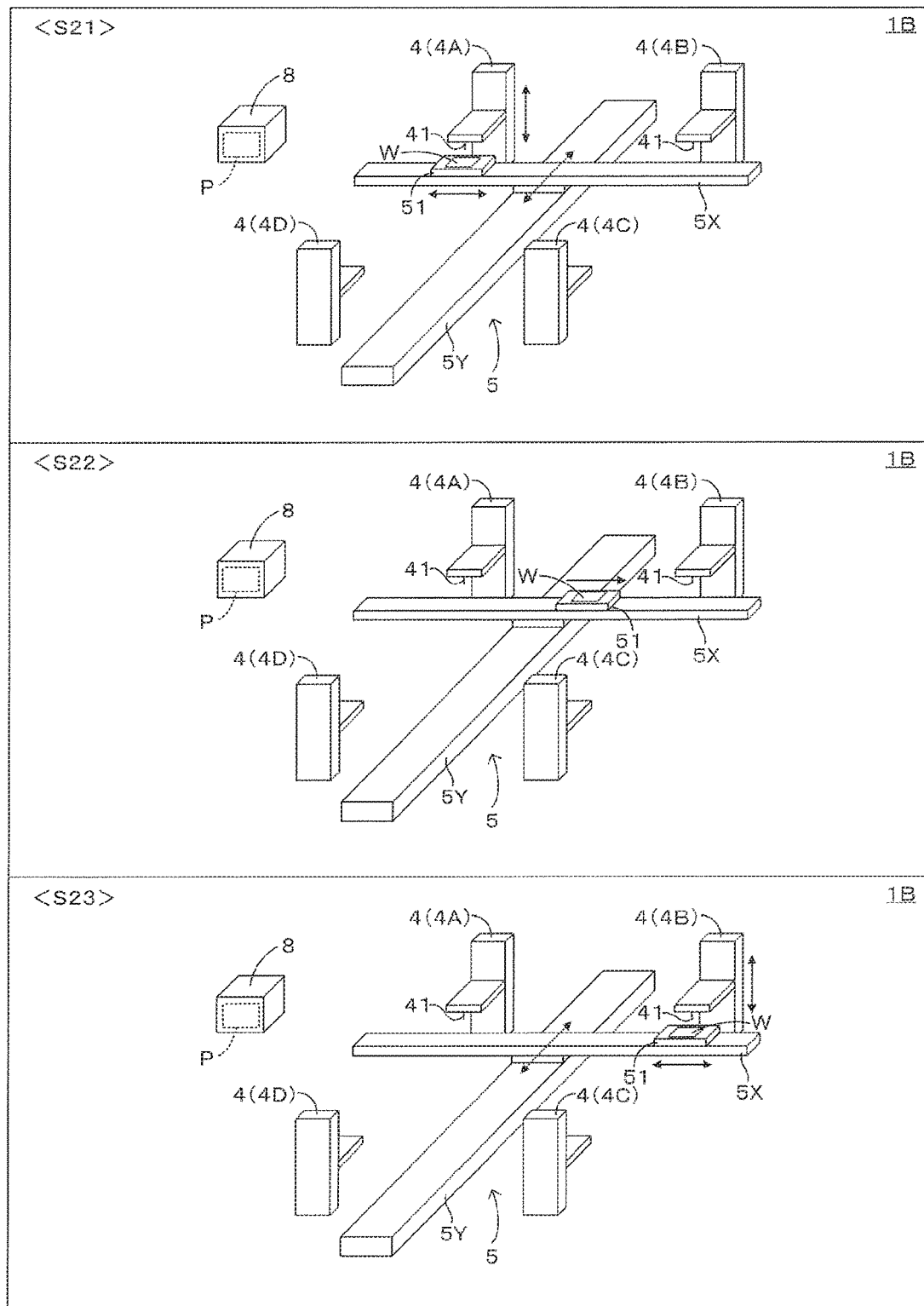
FIG. 3 is a view schematically showing a configuration of a robot system in accordance with a second embodiment of the present disclosure.
Figure 4:
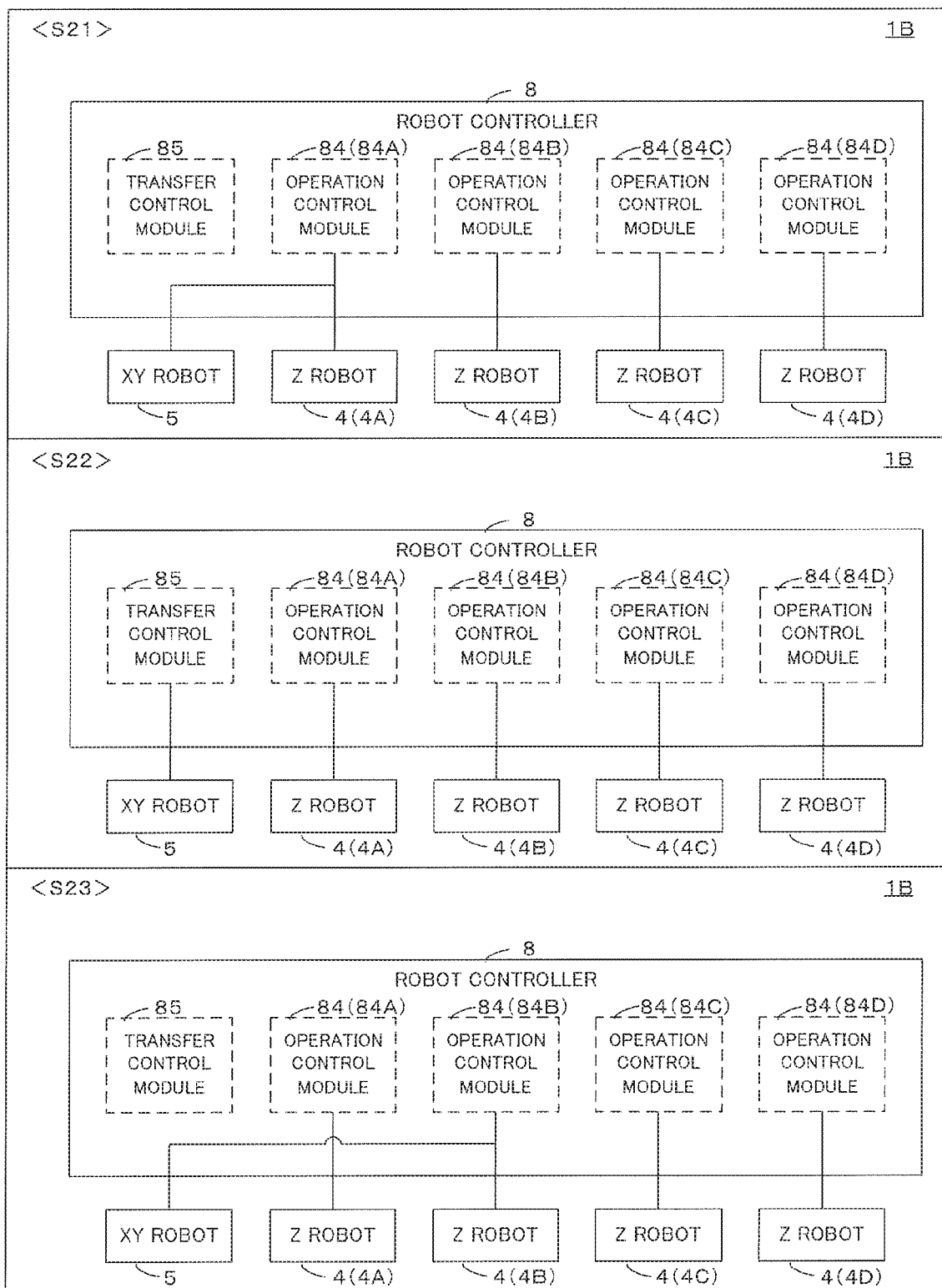
FIG. 4 is a block diagram showing an electrical structure provided in the robot system of FIG. 3.

FIG. 3 is a view schematically showing a configuration of a robot system in accordance with a second embodiment of the present disclosure, and FIG. 4 is a block diagram showing an electrical structure provided in the robot system of FIG. 3. Further, FIGS. 3 and 4 illustrate different Steps S21, S22, and S23 performed by a robot system 1B. Hereinafter, differences from the above-described embodiment will be mainly described, and common points will be represented by corresponding reference signs and description thereof will be omitted as appropriate. It goes without saying, however, that providing constituent elements common to those in the above-described embodiment produces the same effects.

The robot system 1B includes four Z robots 4 which have the same structure. In FIGS. 3 and 4, for distinction, the four Z robots 4 are also represented by different reference signs 4A to 4D. Each of the Z robots 4 has an end effector 41 and has a degree of freedom in the Z direction. Specifically, the Z robot 4 incorporates a one axis motor corresponding to the Z direction, to move the end effector 41 in the Z direction by the motor.

The robot system 1B further includes one XY robot 5. The XY robot 5 has a table 51 for supporting the object W and has degrees of freedom in the X direction and the Y direction. Specifically, the XY robot 5 incorporates a two axes motor corresponding to the X direction and the Y direction, respectively, to move the table 51 in both the X direction and the Y direction by the motor. More specifically, the XY robot 5 has a Y guide 5Y provided in the Y direction, an X guide 5X provided in the X direction on the Y guide 5Y, and a table 51 provided on the X guide 5X, and the Y guide 5Y incorporates a Y-axis motor and the X guide 5X incorporates an X-axis motor. Then, the X guide 5X receives a driving force from the Y-axis motor, to be movable in the Y direction along the Y guide 5Y, and the table 51 receives a driving force from the X-axis motor, to be movable in the X direction along the X guide 5X. Thus, the Y guide 5Y and the X guide 5X transfer the object W in cooperation.

The four Z robots 4 are arranged within a movable range of the table 51 of the XY robot 5, and the XY robot 5 moves the table 51 in the X direction and the Y direction, to thereby transfer the object W among the four Z robots 4. Then, each of the Z robots 4 performs an operation on the transferred object W. At that time, the Z robot 4 and the XY robot 5 perform the operation on the object W in cooperation. In the case where the drawing operation in which a circular mark is drawn on the object W is performed, for example, the Z robot 4 moves the end effector 41 down in the Z direction, to thereby cause the end effector 41 to come into contact with the object W on the table 51 of the XY robot 5. Subsequently, the XY robot 5 causes the table 51 to perform a circular motion. The circular mark is thereby drawn on the object W. After the drawing operation is completed, the Z robot 4 moves the end effector 41 up in the Z direction and the XY robot 5 moves the table 51 in the X direction or the Y direction, to thereby transfer the object W to another Z robot 4. Then, this Z robot 4 performs another operation on the object W in cooperation with the XY robot 5.

Further, in a case where a component such as an electronic component or the like is mounted on the object W or where a coating material is applied onto the object W, for example, the XY robot 5 moves the table 51 in the X direction or the Y direction, to thereby position a portion of the object W on which the component is to be mounted or onto which the coating material is applied below the end effector 41. Then, the Z robot 4 moves the end effector 41 down in the Z direction, to thereby mount the component held thereby on the mounting position or apply the coating material onto the coating position. After this operation is completed, the Z robot 4 moves the end effector 41 up in the Z direction and the XY robot 5 moves the table 51 in the X direction or the Y direction, to thereby transfer the object W to another Z robot 4. Then, this Z robot 4 performs another operation on the object W in cooperation with the XY robot 5.

Further, in order to control the drive of the Z robot 4 and the XY robot 5, the robot controller 8 executes the robot program P, to thereby virtually construct an operation control module 84 and a transfer control module 85. The operation control module 84 is generated for each Z robot 4, and four operation control modules 84 are generated in one-to-one correspondence with the four Z robots 4. Then, each of the operation control modules 84 takes charge of drive control of the motor of the Z robot 4. Further, the transfer control module 85 takes charge of drive control of the motor of the XY robot 5. In FIG. 4, for distinction, the four operation control modules 84 are also represented by different reference signs 84A to 84D.

This robot system 1B can perform various operations in accordance with contents of the robot programs P. Herein, a case will be described where the XY robot 5 transfers the object W to the four Z robots 4 clockwise from the upper left while each of the Z robots 4 and the XY robot 5 perform an operation on the object W in cooperation.

In Step S21, shown is a state in which the XY robot 5 transfers the object W to the Z robot 4A. In this state, the operation control module 84A requests docking between the Z robot 4A and the XY robot 5. The Z robot 4A and the XY robot 5 are thereby virtually docked with each other, to serve as one XYZ robot. Specifically, the robot controller 8 changes the control module in charge of the drive control of the XY robot 5 from the transfer control module 85 to the operation control module 84A, and the operation control module 84A takes charge of the drive control of the Z robot 4A and the drive control of the XY robot 5 (Step S21 of FIG. 4). Then, the operation control module 84A generates a motion for performing the defined operation defined by the robot program P for each of the Z robot 4A and the XY robot 5 by computation. The operation control module 84A synchronizes execution of the motion of the Z robot 4A and execution of the motion of the XY robot 5. The Z robot 4A and the XY robot 5 thereby perform the defined operation on the object W in cooperation.

After the Z robot 4A and the XY robot 5 complete the defined operation, the operation control module 84A requests disengagement of the XY robot 5 from the Z robot 4A. The XY robot 5 is thereby disengaged from the Z robot 4A, and the XY robot 5 and the Z robot 4A can perform operations independently of each other. Specifically, as shown in Step S22 of FIG. 4, the robot controller 8 changes the control module in charge of the drive control of the XY robot 5 from the operation control module 84A to the transfer control module 85, and then the transfer control module 85 takes charge of the drive control of the XY robot 5. The transfer control module 85 generates a motion for performing a transfer operation defined by the robot program P by computation. Then, in response to a command from the transfer control module 85, the XY robot 5 performs the motion, to thereby transfer the object W from the Z robot 4A to the Z robot 4B (Step S22 of FIG. 1). Thus, the transfer control module 85 takes charge of the drive control of the XY robot 5 which transfers the object W between the different Z robots 4.

After the object W is transferred to the Z robot 4B (Step S23 of FIG. 3), the operation control module 84B requests docking between the Z robot 4B and the XY robot 5. As shown in Step S23 of FIG. 4, the XY robot 5 and the Z robot 4B are thereby virtually docked with each other, to serve as one XYZ robot. Then, in the same manner as described above, the Z robot 4B and the XY robot 5 perform a defined operation on the object W in cooperation.

After the Z robot 4B and the XY robot 5 complete the defined operation, in the same manner as described above, the XY robot 5 transfers the object W and performs a defined operation on the object W in cooperation with each of the Z robot 4C and the Z robot 4D. All the defined operations on the object W in the robot system 1B are thereby completed.

In the second embodiment described above, by changing the control module in charge of the drive control of the XY robot 5 from the transfer control module 85 to the operation control module 84, it is possible to cause the Z robot 4 and the XY robot 5 to perform the defined operation in cooperation. Thus, it is thereby possible to simply switch between a mode in which the XY robot 5 performs an operation independently of the Z robot 4 and another mode in which the XY robot 5 and the Z robot 4 perform an operation in cooperation.

Further, after the defined operation performed by the Z robot 4 and the XY robot 5 in cooperation is completed, the control module in charge of the drive control of the XY robot 5 is transferred from the operation control module 84 to the transfer control module 85. It is thereby possible to cause the XY robot 5 to start the transfer operation independently of the Z robot 4.

Furthermore, the XY robot 5 transfers the object W among the plurality of Z robots 4 and the Z robot 4 performs a defined operation on the object W transferred by the XY robot 5. Thus, through an assembly line operation using the plurality of Z robots 4, it is possible to efficiently perform an operation on the object W. Further, the Z robot 4 performs an operation on the object W transferred by the XY robot 5 in cooperation with the XY robot 5. Thus, by causing the Z robot 4 the XY robot 5 to cooperate, it is possible to effectively utilize the degree of freedom of the XY robot 5 in execution of the defined operation.

In other words, in order to move the end effector 41 of the Z robot 4 relatively to the object W, the XY robot 5 having the degrees of freedom in the X direction and Y direction which are transfer directions of the object W takes charge of the relative movement in the X direction and the Y direction and the Z robot 4 having the degree of freedom in the Z direction takes charge of the relative movement in the Z direction. Thus, since the Z robot 4 and the XY robot 5 perform a defined operation in cooperation while sharing the loads, it is possible to reduce the degrees of freedom (in other words, the number of axes) that each of the Z robot 4 and the XY robot 5 has, to minimum (1 axis+2 axes=3 axes), and to simplify the configuration of the robot system 1B.

Figure 5:
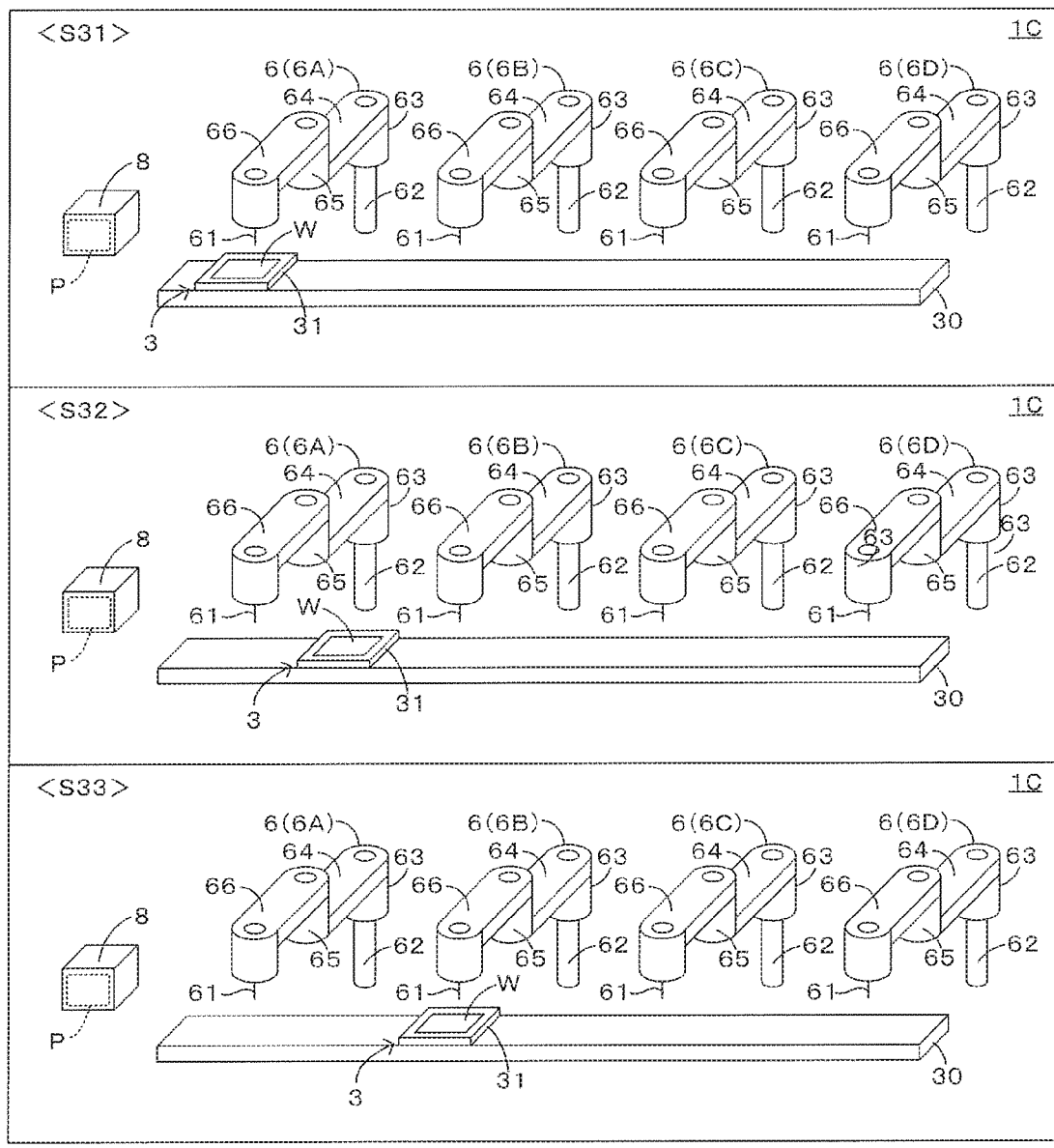
FIG. 5 is a view schematically showing a configuration of a robot system in accordance with a third embodiment of the present disclosure.
Figure 6:
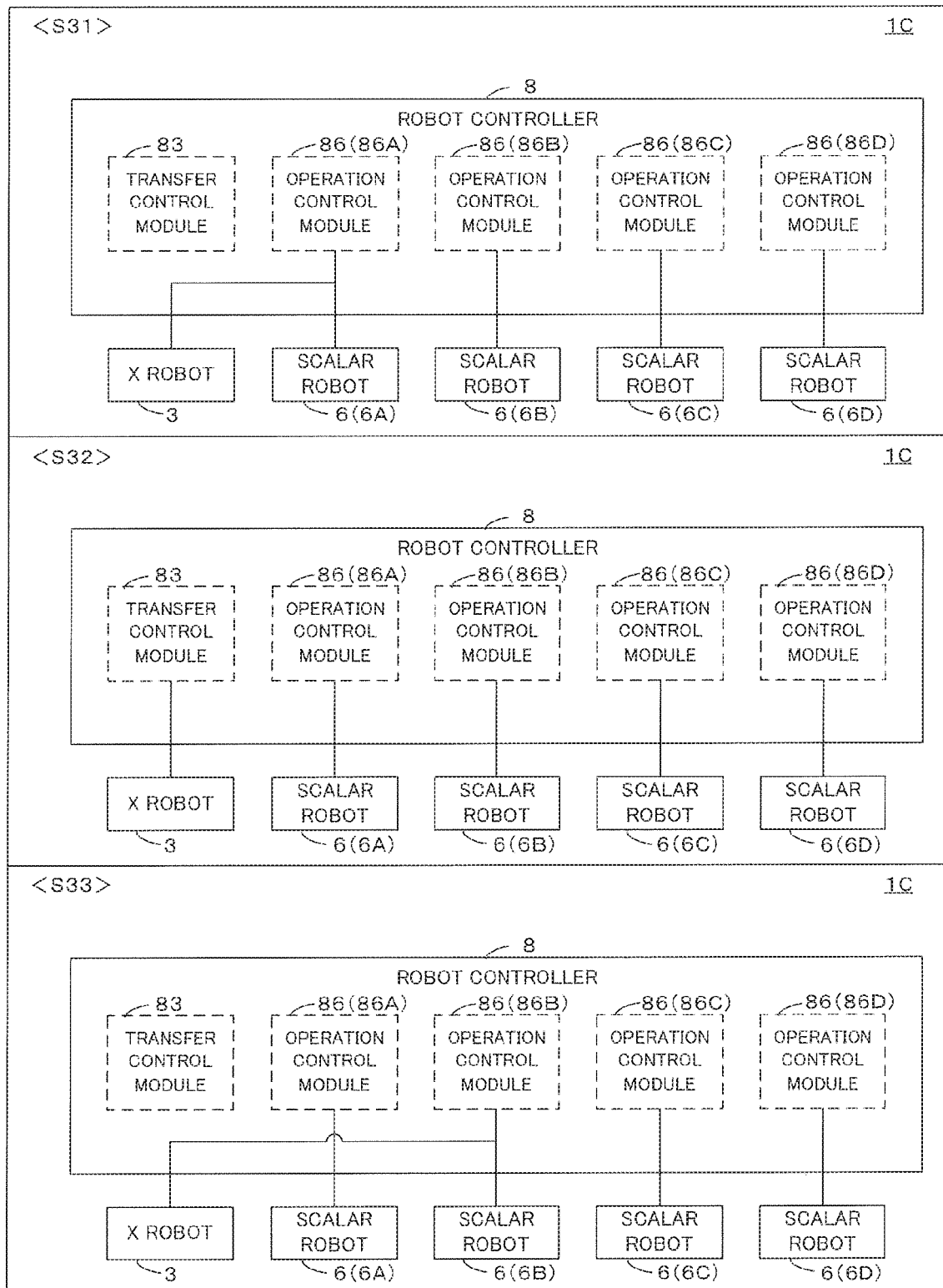
FIG. 6 is a block diagram showing an electrical structure provided in the robot system of FIG. 5.

FIG. 5 is a view schematically showing a configuration of a robot system in accordance with a third embodiment of the present disclosure, and FIG. 6 is a block diagram showing an electrical structure provided in the robot system of FIG. 5. Further, FIGS. 5 and 6 illustrate different Steps S31, S32, and S33 performed by a robot system 1C. Hereinafter, differences from the above-described embodiments will be mainly described, and common points will be represented by corresponding reference signs and description thereof will be omitted as appropriate. It goes without saying, however, that providing constituent elements common to those in the above-described embodiments produces the same effects.

The robot system 1C includes four scalar robots 6 which have the same structure. In FIGS. 5 and 6, for distinction, the four scalar robots 6 are also represented by different reference signs 6A to 6D. Each of the scalar robots 6 has an end effector 61 and has degrees of freedom in the X direction, the Y direction, and the Z direction. Specifically, the scalar robot 6 includes a basic axis 62 extended in the Z direction, a rotary joint 63 attached to an upper end of the basic axis 62, an arm 64 extended from the rotary joint 63 in a horizontal direction, a rotary joint 65 attached to a tip of the arm 64, and an arm 66 extended from the rotary joint 65 in the horizontal direction, and the end effector 61 is attached to a tip of the arm 66. The rotary joints 63 and 65 are each rotatable around a rotation axis in parallel with the Z direction, and the end effector 61 is vertically movable in the Z direction. Then, an R3 motor for rotating the rotary joint 63 is incorporated in the basic axis 62, an R5 motor for rotating the rotary joint 65 is incorporated in the arm 64, and a Z motor for moving the end effector 61 up and down is incorporated in the arm 66. Therefore, by rotating the rotary joint 63 by the R3 motor and rotating the rotary joint 65 by the R5 motor, the end effector 61 can be thereby moved in the X direction and the Y direction. Further, the end effector 61 can be moved in the Z direction by the Z motor. In other words, the scalar robot 6 can move the end effector 61 in each of the X direction, the Y direction, and the Z direction. The end effector 61 can rotate (itself) by receiving a driving force from an R61 motor incorporated in the arm 66. Further, the robot system 1C includes the X robot 3 having the configuration described in the first embodiment, as well as these four scalar robots 6.

The four scalar robots 6 are aligned adjacent to the linear guide 30 along the X direction and the X robot 3 moves the table 31 in the X direction, to thereby transfer the object W in the X direction among the four scalar robots 6. Then, each of the scalar robots 6 performs an operation on the transferred object W. At that time, the scalar robot 6 and the X robot 3 perform the operation on the object W in cooperation. In the case where the drawing operation in which a circular mark is drawn on the object W is performed, for example, the process is executed as follows.

The X robot 3 continues to move the table 31 toward the scalar robot 6B in the X direction. In contrast to this, the scalar robot 6 moves the end effector 61 down in the Z direction, to thereby cause the end effector 61 to come into contact with the object W, and then causes the end effector 61 to perform a motion obtained by combining a circular motion with a linear motion of the table 31 within the XY plane. The circular mark is thereby drawn on the object W being moved in the X direction. After the drawing operation is completed, the scalar robot 6 moves the end effector 61 up in the Z direction and the X robot 3 continues to move the table 31 in the X direction, to thereby transfer the object W to another scalar robot 6. Then, this scalar robot 6 performs another operation on the object W in cooperation with the X robot 3. At that time, the X robot 3 moves the table 31 from the scalar robot 6A to the scalar robot 6B at a speed higher than a movement speed of the table 31 during a period while the X robot 3 performs an operation in cooperation with the scalar robot 6A. It is thereby possible to swiftly start an operation to be performed by the scalar robot 6B and the X robot 3.

Further, in order to control the drive of the scalar robot 6 and the X robot 3, the robot controller 8 executes the robot program P, to thereby virtually construct an operation control module 86 and a transfer control module 83. The operation control module 86 is generated for each scalar robot 6, and four operation control modules 86 are generated in one-to-one correspondence with the four scalar robots 6. Then, each of the operation control modules 86 takes charge of drive control of the motor of the corresponding scalar robot 6. Further, the transfer control module 83 takes charge of drive control of the motor of the X robot 3. In FIG. 6, for distinction, the four operation control modules 86 are also represented by different reference signs 86A to 86D.

This robot system 1C can perform various operations in accordance with contents of the robot programs P. Herein, a case will be described where the X robot 3 transfers the object W to the four scalar robots 6 sequentially from the left side while each of the scalar robots 6 and the X robot 3 perform an operation on the object W in cooperation.

In Step S31, shown is a state in which the X robot 3 transfers the object W to the scalar robot 6A. In this state, the operation control module 86A requests docking between the scalar robot 6A and the X robot 3. The scalar robot 6A and the X robot 3 are thereby virtually docked with each other, to serve as one robot. Specifically, the robot controller 8 changes the control module in charge of the drive control of the X robot 3 from the transfer control module 83 to the operation control module 86A, and the operation control module 86A takes charge of the drive control of the scalar robot 6A and the drive control of the X robot 3 (Step S31 of FIG. 6). Then, the operation control module 86A generates a motion for performing the defined operation defined by the robot program P for each of the scalar robot 6A and the X robot 3 by computation.

This defined operation is an operation for causing the end effector 61 to operate while continuously moving the table 31 in the X direction. Specifically, the operation control module 86A generates a motion for moving the table 31 toward the scalar robot 6B (i.e., on a downstream side in the transfer direction X), for the X robot 3. Further, the operation control module 86 generates a motion obtained by combining the motion of the end effector 61 in execution of the defined operation on the stationary object W and the linear motion of the table 31, for the scalar robot 6A. Then, the operation control module 86A synchronizes execution of the motion of the scalar robot 6A and execution of the motion of the X robot 3. The scalar robot 6A and the X robot 3 thereby perform a defined operation on the object W in cooperation.

After the scalar robot 6A and the X robot 3 complete the defined operation, the operation control module 86A requests disengagement of the X robot 3 from the scalar robot 6A. The X robot 3 is thereby disengaged from the scalar robot 6A, and the X robot 3 and the scalar robot 6A can perform operations independently of each other. Specifically, as shown in Step S32 o FIG. 6, the robot controller 8 changes the control module in charge of the drive control of the X robot 3 from the operation control module 86A to the transfer control module 83, and then the transfer control module 83 takes charge of the drive control of the X robot 3. The transfer control module 83 generates a motion for performing a transfer operation defined by the robot program P by computation. Then, in response to a command from the transfer control module 83, the X robot 3 performs the motion, to thereby transfer the object W from the scalar robot 6A to the scalar robot 6B (Step S32 of FIG. 5). Thus, the transfer control module 83 takes charge of the drive control of the X robot 3 which transfers the object W between the different scalar robots 6.

After the object W is transferred to the scalar robot 6B (Step S33 of FIG. 5), the operation control module 86B requests docking between the scalar robot 6B and the X robot 3. As shown in Step S33 of FIG. 6, the X robot 3 and the scalar robot 6B are thereby virtually docked with each other, to serve as one robot. Then, in the same manner as described above, the scalar robot 6B and the X robot 3 perform a defined operation on the object W in cooperation.

After the scalar robot 6B and the X robot 3 complete the defined operation, in the same manner as described above, the X robot 3 transfers the object W in the X direction and performs a defined operation on the object W in cooperation with each of the scalar robot 6C and the scalar robot 6D. All the defined operations on the object W in the robot system 1C are thereby completed.

In the third embodiment described above, by changing the control module in charge of the drive control of the X robot 3 from the transfer control module 83 to the operation control module 86, it is possible to cause the scalar robot 6 and the X robot 3 to perform the defined operation in cooperation. Thus, it is thereby possible to simply switch between a mode in which the X robot 3 performs an operation independently of the scalar robot 6 and another mode in which the X robot 3 and the scalar robot 6 perform an operation in cooperation.

Further, after the defined operation performed by the scalar robot 6 and the X robot 3 in cooperation is completed, the control module in charge of the drive control of the X robot 3 is transferred from the operation control module 86 to the transfer control module 83. It is thereby possible to cause the X robot 3 to perform the transfer operation independently of the scalar robot 6.

Furthermore, in the defined operation performed by the scalar robot 6 and the X robot 3 in cooperation, the operation of transferring the object W in the X direction is performed by the X robot 3 and the operation of moving the end effector 61 relatively to the object W in the X direction, the Y direction, and the Z direction is performed by the scalar robot 6. Therefore, since the object W is continuously transferred in the X direction also during the operation performed on the object W, the transfer of the object W can be performed swiftly and this is advantageous in reducing the takt time (i.e., time required to complete all the defined operations on the object W).

Figure 7:
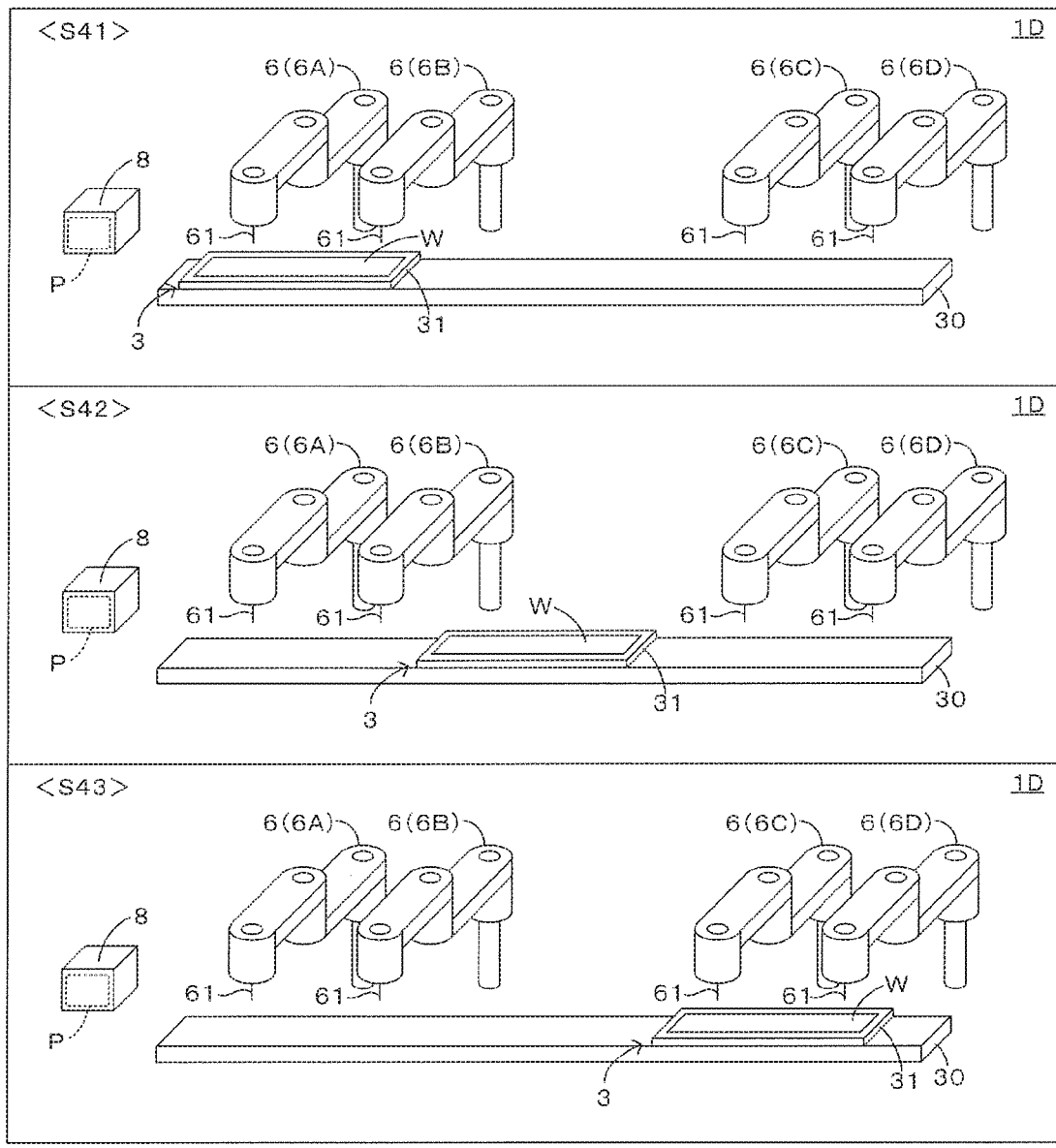
FIG. 7 is a view schematically showing a configuration of a robot system in accordance with a fourth embodiment of the present disclosure.
Figure 8:
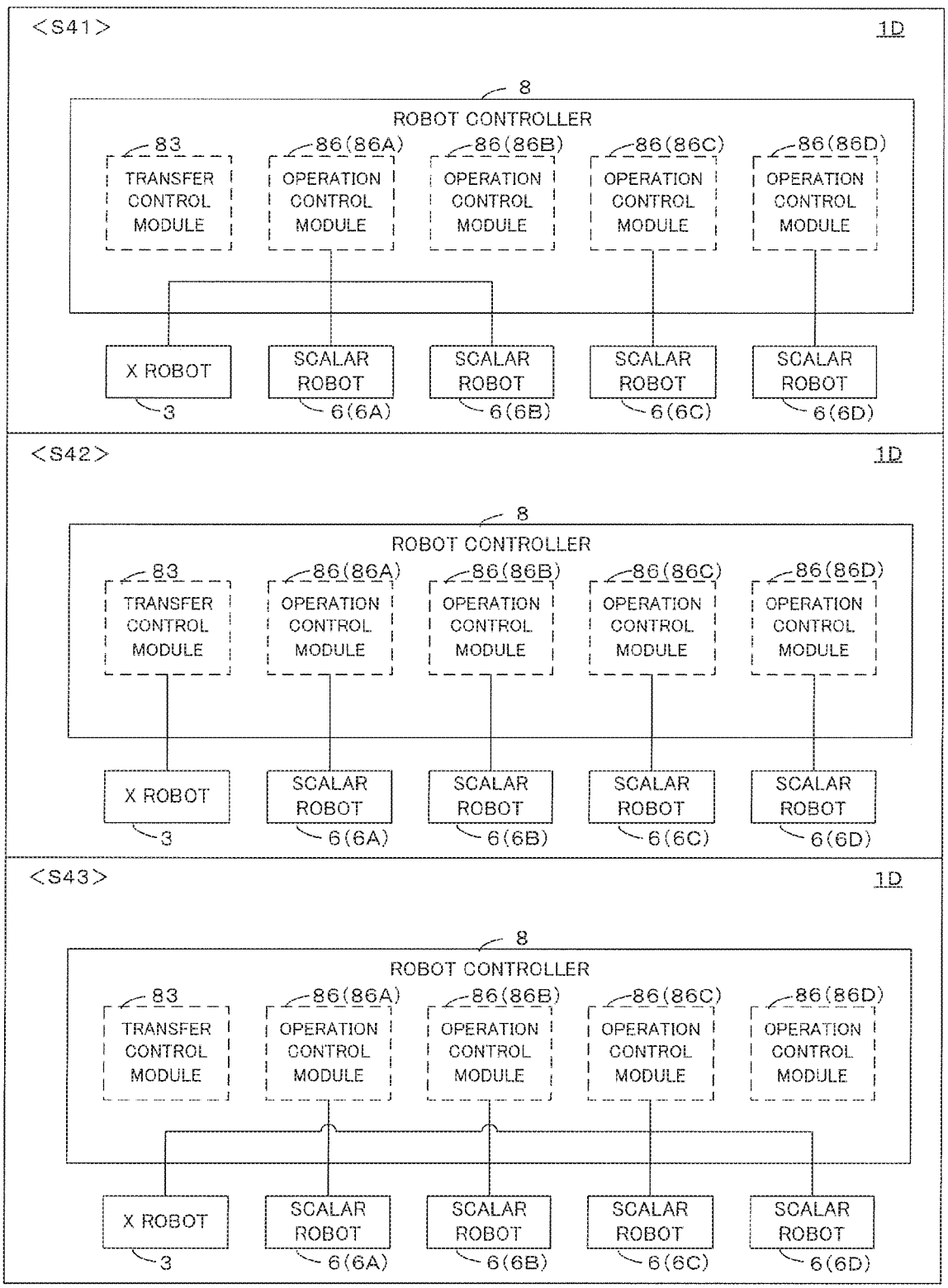
FIG. 8 is a block diagram showing an electrical structure provided in the robot system of FIG. 7.

FIG. 7 is a view schematically showing a configuration of a robot system in accordance with a fourth embodiment of the present disclosure, and FIG. 8 is a block diagram showing an electrical structure provided in the robot system of FIG. 7. Further, FIGS. 7 and 8 illustrate different Steps S41, S42, and S43 performed by a robot system 1D. Hereinafter, differences from the above-described embodiments will be mainly described, and common points will be represented by corresponding reference signs and description thereof will be omitted as appropriate. It goes without saying, however, that providing constituent elements common to those in the above-described embodiments produces the same effects.

The robot system 1D includes four scalar robots 6 (6A to 6D) and the X robot 3. The four scalar robots 6 are aligned adjacent to the linear guide 30 along the X direction and the X robot 3 moves the table 31 in the X direction, to thereby transfer the object W in the X direction among the four scalar robots 6. Then, each of the scalar robots 6 performs an operation on the transferred object W. In the present embodiment, particularly, two scalar robots 6A and 6B perform an operation on the object W in cooperation, and then two scalar robots 6C and 6D perform an operation on the object W in cooperation. In this exemplary case, each of the scalar robots 6A and 6C serves as an example of the "first-type robot" of the present disclosure, and each of the scalar robots 6C and 6D serves as an example of the "third-type robot" of the present disclosure.

In other words, the operation control module 86 and the transfer control module 83 are virtually constructed. The operation control module 86 is generated for each scalar robot 6, and four operation control modules 86 (86A to 86D) are generated in one-to-one correspondence with the four scalar robots 6. Then, each of the operation control modules 86 takes charge of drive control of the motor of the corresponding scalar robot 6. Further, the transfer control module 83 takes charge of drive control of the motor of the X robot 3.

In Step S41, shown is a state in which the X robot 3 transfers the object W to the scalar robots 6A and 6B. In this state, the operation control module 86A requests docking between the scalar robot 6A and the X robot 3 and docking between the scalar robot 6A and the scalar robot 6B. The scalar robot 6A and the X robot 3 are thereby virtually docked with each other and the scalar robot 6A and the scalar robot 6B are thereby virtually docked with each other, and the scalar robots 6A and 6B and the X robot 3 serve as one robot. Specifically, the robot controller 8 changes the control module in charge of the drive control of the X robot 3 from the transfer control module 83 to the operation control module 86A and changes the control module in charge of the drive control of the scalar robot 6B from the operation control module 86B to the operation control module 86A. As a result, the operation control module 86A takes charge of the drive control of the scalar robots 6A and 6B and the drive control of the X robot 3 (Step S41 of FIG. 8). Then, the operation control module 86A generates a motion for performing the defined operation defined by the robot program P for each of the scalar robots 6A and 6B and the X robot 3 by computation. Then, the operation control module 86A synchronizes execution of the motion of the scalar robot 6A, execution of the motion of the scalar robot 6B, and execution of the motion of the X robot 3. The scalar robots 6A and 6B and the X robot 3 thereby perform a defined operation on the object W in cooperation.

After the scalar robots 6A and 6B and the X robot 3 complete the defined operation, the operation control module 86A requests disengagement of the X robot 3 and the scalar robot 6B from the scalar robot 6A. The X robot 3 and the scalar robot 6B are thereby disengaged from the scalar robot 6A, and the X robot 3 and the scalar robots 6A and 6B can perform operations independently of one another. Specifically, as shown in Step S42 o FIG. 8, the robot controller 8 changes the control module in charge of the drive control of the X robot 3 from the operation control module 86A to the transfer control module 83, and changes the control module in charge of the drive control of the scalar robot 6B from the operation control module 86A to the operation control module 86B. The transfer control module 83 thereby takes charge of the drive control of the X robot 3, and the operation control module 86B thereby takes charge of the drive control of the scalar robot 6B. Subsequently, the transfer control module 83 generates a motion for performing a transfer operation defined by the robot program P by computation. Then, in response to a command from the transfer control module 83, the X robot 3 performs the motion, to thereby transfer the object W from the scalar robots 6A and 6B to the scalar robots 6C and 6D (Step S42 of FIG. 7). Thus, the transfer control module 83 takes charge of the drive control of the X robot 3 which transfers the object W between the different scalar robots 6.

After the object W is transferred to the scalar robots 6C and 6D (Step S43 of FIG. 7), the operation control module 86C requests docking between the scalar robot 6C and the X robot 3 and docking between the scalar robot 6C and the scalar robot 6D. As shown in Step S43 of FIG. 8, the scalar robot 6C and the X robot 3 are thereby virtually docked with each other and the scalar robot 6C and the scalar robot 6D are thereby virtually docked with each other, and the scalar robots 6C and 6D and the X robot 3 serve as one robot. Then, in the same manner as described above, the scalar robots 6C and 6D and the X robot 3 perform a defined operation on the object W in cooperation. All the defined operations on the object W in the robot system 1D are thereby completed.

In the fourth embodiment described above, by changing the control module in charge of the drive control of the X robot 3 from the transfer control module 83 to the operation control module 86A and changing the control module in charge of the drive control of the scalar robot 6B from the operation control module 86B to the operation control module 86A, it is possible to cause the scalar robots 6A and 6B and the X robot 3 to perform the defined operation in cooperation. Thus, it is thereby possible to simply switch between a mode in which the X robot 3 performs an operation independently of the scalar robots 6A and 6B and another mode in which the X robot 3 and the scalar robots 6A and 6B perform an operation in cooperation. Further, the same control can be performed for the X robot 3 and the scalar robots 6C and 6D.

Furthermore, after the defined operation performed by the scalar robots 6 and the X robot 3 in cooperation is completed, the control module in charge of the drive control of the X robot 3 is changed from the operation control module 86 to the transfer control module 83. It is thereby possible to cause the X robot 3 to perform the transfer operation independently of the scalar robots 6.

In the present embodiment as described above, the robot system 1A-1D corresponds to an exemplary "robot system" of the present disclosure, the robot controller 8 corresponds to an exemplary "robot controller" of the present disclosure, the robot program 9 corresponds to an exemplary "robot program" of the present disclosure, the object W corresponds to an exemplary "object" of the present disclosure. In the first embodiment, the YZ robot 2 corresponds to an exemplary "first-type robot" of the present disclosure, the end effector 21 corresponds to an exemplary "end effector" of the present disclosure, the X robot 3 corresponds to an exemplary "second-type robot" of the present disclosure, the operation control module 82 corresponds to an exemplary "first-type control part" of the present disclosure, the transfer control module 83 corresponds to an exemplary "second-type control part" of the present disclosure, the X direction corresponds to an exemplary "first direction" of the present disclosure, the Y direction and the Z direction corresponds to an exemplary "second direction" and "third direction" of the present disclosure. In the second embodiment, the Z robot 4 corresponds to an exemplary "first-type robot" of the present disclosure, the end effector 41 corresponds to an exemplary "end effector" of the present disclosure, the XY robot 5 corresponds to an exemplary "second-type robot" of the present disclosure, the operation control module 84 corresponds to an exemplary "first-type control part" of the present disclosure, the transfer control module 85 corresponds to an exemplary "second-type control part" of the present disclosure, the X direction and Y direction corresponds to an exemplary "first direction" and "second direction" of the present disclosure, the Z direction corresponds to an exemplary "third direction" of the present disclosure. In the third embodiment, the scalar robot 6 corresponds to an exemplary "first-type robot" of the present disclosure, the end effector 61 corresponds to an exemplary "end effector" of the present disclosure, the X robot 3 corresponds to an exemplary "second-type robot" of the present disclosure, the operation control module 86 corresponds to an exemplary "first-type control part" of the present disclosure, the transfer control module 83 corresponds to an exemplary "second-type control part" of the present disclosure, the X direction corresponds to an exemplary "first direction" of the present disclosure, the Y direction and the Z direction corresponds to an exemplary "second direction" and "third direction" of the present disclosure. In the fourth embodiment, the scalar robot 6A, 6C corresponds to an exemplary "first-type robot" of the present disclosure, the X robot 3 corresponds to an exemplary "second-type robot" of the present disclosure, the scalar robot 6A, 6C corresponds to an exemplary "third-type robot" of the present disclosure, the operation control module 86A, 86C corresponds to an exemplary "first-type control part" of the present disclosure, the transfer control module 83 corresponds to an exemplary "second-type control part" of the present disclosure, the operation control module 86B, 86D corresponds to an exemplary "third-type control part" of the present disclosure.

Further, the present disclosure is not limited to the above-described embodiments, but numerous modifications and variations can be added to those described above without departing from the scope of the disclosure. The present disclosure can be also applied to, for example, a vertically articulated robot or a robot using a parallel link mechanism.

Furthermore, in the above-described embodiments, the linear guide 30 is equipped with one X robot 3. The linear guide 30 may be, however, equipped with a plurality of X robots 3. In a case of having such a configuration, the robot controller 8 constructs a plurality of transfer control modules 83 in one-to-one correspondence with the plurality of X robots 3, and each of the transfer control modules 83 takes charge of the drive control of the corresponding X robot 3. Further, in a case where the X robot 3 performs a defined operation in cooperation with the YZ robot 2 or the scalar robot 6, these robots are docked in the same manner as described above.

The manner in which the robots are docked in accordance with the robot program P may be changed as appropriate. Therefore, a proximity sensor is provided adjacent to the YZ robot 2, the Z robot 4, or the scalar robot 6, and when the proximity sensor detects the approach of the object W, for example, the robot program P may be made so that the YZ robot 2, the Z robot 4, or the scalar robot 6 may be docked with the X robot 3 or the XY robot 5.

Further, the number of YZ robots 2, Z robots 4, or scalar robots 6 is not limited to the above-described examples, but may be changed as appropriate.

Furthermore, the specific structure of the X robot 3 or the XY robot 5 may be changed as appropriate, and these robots may be each formed of, for example, a linear motor and the like.

The present disclosure can be applied to all technologies for driving a plurality of robots and causing them to execute operation.

What is claimed is:

1. A robot system, comprising:
a controller for executing a robot control program;
a first robot; and
a second robot;
wherein the controller executes a first module to take charge of drive control of the first robot;
and
the controller executes a second module to take charge of drive control of the second robot;
wherein when the first robot and the second robot together perform a cooperative operation on the same object, the controller changes the drive control of the second robot from the second module to the first module such that the first module takes charge of the drive control of both the first robot and the second robot.

2. The robot system according to claim 1, wherein,
after the cooperative operation performed by the first robot and the second robot is completed on the same object, the controller changes the drive control of the second robot from the first module back to the second module.

3. The robot system according to claim 1, wherein
among a first axis, a second axis, and a third axis, which are each orthogonal to one another, the second robot is configured to move the same object along the first axis with one degree of freedom along the first axis and zero degrees of freedom along both the second axis and along the third axis;
the first robot has first end effector which performs a non-cooperative operation on the same object, and has one degree of freedom along both the second axis and the third axis and zero degrees of freedom along the first axis; and
during the cooperative operation performed by the first robot and the second robot on the same object, the controller executes the first module to cause the second robot to move a second end effector of the second robot relative to the same object along the first axis and to cause the first robot to move the first end effector relative to the same object along each of the second axis and the third axis.

4. The robot system according to claim 1, wherein
among a first axis, a second axis, and a third axis, which are each orthogonal to one another, the second robot is configured to move the same object along the first axis and the second axis with one degree of freedom along both the first axis and the second axis and zero degrees of freedom along the third axis;
the first robot has first end effector which performs a non-cooperative operation on the same object, and has one degree of freedom along the third axis and zero degrees of freedom along both the first axis and the second axis; and
during the cooperative operation performed by the first robot and the second robot in the same object, the controller executes the first module to cause the second robot to move the same object relatively to the first end effector along both the first axis and the second axis and to cause the first robot to move the first end effector relative to the same object along the third axis.

5. The robot system according to claim 1, wherein
among a first axis, a second axis, and a third axis, which are each orthogonal to one another, the second robot is configured to, using a second end effector of the second robot, move the same object along the first axis with one a degree of freedom along the first axis;
wherein the first robot has a first end effector with one degree of freedom along each of the first axis, the second axis, and the third axis; and
during the cooperative operation performed by the first robot and the second robot the same object, the controller executes the first module to cause the second robot to move the same object along the first axis and to cause the first robot to move the first robot end effector relative the same object along each of the first axis, the second axis, and the third axis.

6. The robot system according to claim 1, further comprising:
a third robot;
wherein the controller executes a third module to take charge of drive control of the third robot; and
wherein, when the first robot, the second robot, and the third robot perform a three-robot cooperative operation together on the same object, the controller changes the drive control of the third robot from the third module to the first module, and the first module takes charge of all three of the drive controls of the first robot, the second robot, and the third robot.

7. A robot controller, comprising:
a first module; and
a second module,
wherein the controller executes:
the first module to take charge of drive control of a first robot; and
the second module to take charge of drive control of a second robot,
wherein, before the first robot and the second robot together perform a cooperative operation on a same object, the controller changes the drive control of the second robot from the second module to the first module, such that the first module takes charge of the drive control of both the first robot and the second robot.

8. A robot control method executed by a controller, comprising steps of:
executing a first module to take charge of drive control of a first robot;
executing a second module to take charge of drive control of a second robot;
changing the drive control of second robot from the second module to the first module such that the first module takes charge of the drive control of each of the first robot and the second robot; and
executing, after changing the drive control of the second robot from the second module to the first module, the first module to drive both the first robot and the second robot to perform cooperative operation on a same object.

9. A robot program stored on a non-transitory computer readable medium, causing a computer to execute:
a first module to take charge of drive control of a first robot;
a second module to take charge of drive control of a second robot; and
a transfer in which the drive control of the second robot is transferred from the second module to the first module such that the first module takes charge of the drive control of both the first robot and the second robot, to thereby cause the first robot and the second robot to perform a cooperative operation on a same object.

10. The robot system according to claim 2, wherein
among a first axis, a second axis, and a third axis which are each orthogonal to one another, the second robot is configured to move the same object along the first axis with a degree of freedom along the first axis and has zero degrees of freedom along the second axis and zero degrees of freedom along the third axis,
the first robot has a first end effector which performs a non-cooperative operation on the same object, and has one degree of freedom along each of the second axis and along the third axis and has zero degrees of freedom along the first axis, and
during the cooperative operation performed by the first robot and the second robot, the controller executes the first module to cause the second robot to move a second end effector relative to the same object along the first axis and to cause the first robot to move the first end effector relative to the same object along the second axis and along the third axis.

11. The robot system according to claim 2, wherein
among a first axis, a second axis, and a third axis which are each orthogonal to one another, the second robot is configured to move the same object along the first axis and along the second axis with a degree of freedom along the first axis and one degree of freedom along the second axis and has zero degrees of freedom along the third axis,
the first robot has a first end effector which performs a non-cooperative operation on the same object, and has one degree of freedom in along the third axis and has zero degrees of freedom along the first axis and zero degrees of freedom along the second axis; and
during the cooperative operation performed together by the first robot and the second robot, the controller executes the first module to cause the second robot to move the same object relatively to the first end effector along the first axis and the second axis and to cause the first robot to move the first end effector relative to the same object along the third axis.

12. The robot system according to claim 2, wherein
among a first axis, a second axis, and a third axis which are each orthogonal to one another, the second robot is configured to move the same object along the first axis with one degree of freedom along the first axis,
the first robot has one degree of freedom along each of the first axis, the second axis, and the third axis, and
during the cooperative operation performed together by the first robot and the second robot, the controller executes the first module to cause the second robot to move the same object along the first axis and to cause the first robot to move the first end effector of the first robot relative to the same object along each of the first axis, the second axis, and the third axis.

13. The robot system according to claim 2, further comprising:
a third robot;
wherein the controller executes a third module to take charge of drive control of the third robot; and
wherein before the first robot, the second robot, and the third robot perform a three-robot cooperative operation, the controller changes control of the third robot from the third module to the first module, and the first module takes charge of the drive controls of all three of the first robot, the second robot, and the third robot.

14. The robot system according to claim 3, further comprising:
a third robot;
wherein the controller executes a third module to take charge of drive control of the third robot; and
wherein before the first robot, the second robot, and the third robot perform a three-robot cooperative operation, the controller changes control of the third robot from the third module to the first module, and the first module takes charge of the drive controls of all three of the first robot, the second robot, and the third robot.

15. The robot system according to claim 4, further comprising:
- a third robot;
    - wherein the controller executes a third module to take charge of drive control of the third robot; and
    - wherein before the first robot, the second robot, and the third robot perform a three-robot cooperative operation, the controller changes control of the third robot from the third module to the first module, and the first module takes charge of the drive controls of all three of the first robot, the second robot, and the third robot.

16. The robot system according to claim 5, further comprising:
- a third robot;
    - wherein the controller executes a third module to take charge of drive control of the third robot; and
    - wherein before the first robot, the second robot, and the third robot perform a three-robot cooperative operation, the controller changes control of the third robot from the third module to the first module, and the first module takes charge of the drive controls of all three of the first robot, the second robot, and the third robot.

17. The robot system according to claim 10, further comprising:
- a third robot;
    - wherein the controller executes a third module to take charge of drive control of the third robot; and
    - wherein before the first robot, the second robot, and the third robot perform a three-robot cooperative operation, the controller changes control of the third robot from the third module to the first module, and the first module takes charge of the drive controls of the first robot, the second robot, and the third robot.

18. The robot system according to claim 11, further comprising:
- a third robot;
    - wherein the controller executes a third module to take charge of drive control of the third robot; and
    - wherein before the first robot, the second robot, and the third robot perform a three-robot cooperative operation, the controller changes control of the third robot from the third module to the first module, and the first module takes charge of the drive controls of all three of the first robot, the second robot, and the third robot.

19. The robot system according to claim 12, further comprising:
- a third robot;
    - wherein the controller executes a third module to take charge of drive control of the third robot; and
    - wherein before the first robot, the second robot, and the third robot perform a three-robot cooperative operation, the controller changes control of the third robot from the third module to the first module, and the first module takes charge of the drive controls of all three of the first robot, the second robot, and the third robot.

* * * * *